(12) United States Patent
Iida

(10) Patent No.: US 7,418,632 B2
(45) Date of Patent: Aug. 26, 2008

(54) SERVICE PROCESSING SYSTEM, PROCESSING RESULT MANAGEMENT DEVICE AND PROCESSING RESULT CHECKING METHOD OF SERVICE PROCESSING SYSTEM

(75) Inventor: Hiroshi Iida, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 414 days.

(21) Appl. No.: 10/786,032

(22) Filed: Feb. 26, 2004

(65) Prior Publication Data

US 2004/0205376 A1 Oct. 14, 2004

(30) Foreign Application Priority Data

Mar. 24, 2003 (JP) .............................. 2003-081200

(51) Int. Cl.
G06F 11/00 (2006.01)
(52) U.S. Cl. ........................................................ 714/39
(58) Field of Classification Search .................... 714/4, 714/33, 37, 39, 40, 47; 709/224; 702/183
See application file for complete search history.

(56) References Cited

U.S. PATENT DOCUMENTS

| | | | | |
|---|---|---|---|---|
| 6,021,444 | A * | 2/2000 | Fukasawa | 719/313 |
| 6,088,737 | A * | 7/2000 | Yano et al. | 709/235 |
| 6,564,245 | B1 * | 5/2003 | Fukasawa et al. | 709/205 |
| 7,020,697 | B1 * | 3/2006 | Goodman et al. | 709/223 |
| 7,031,778 | B2 * | 4/2006 | Hsiung et al. | 700/29 |
| 7,120,910 | B2 | 10/2006 | Matsuda et al. | |
| 2002/0149799 | A1 * | 10/2002 | Hayashi | 358/406 |
| 2002/0184405 | A1 * | 12/2002 | Omori et al. | 709/318 |
| 2004/0006552 | A1 * | 1/2004 | Kakigi | 707/1 |
| 2004/0057065 | A1 * | 3/2004 | Michimura et al. | 358/1.13 |
| 2005/0027825 | A1 * | 2/2005 | Hikawa et al. | 709/219 |
| 2005/0171930 | A1 * | 8/2005 | Arning et al. | 707/2 |
| 2005/0206939 | A1 * | 9/2005 | Tsutsumi et al. | 358/1.13 |
| 2005/0213116 | A1 * | 9/2005 | Uejo | 358/1.1 |
| 2005/0256818 | A1 * | 11/2005 | Sun et al. | 706/46 |
| 2006/0059253 | A1 * | 3/2006 | Goodman et al. | 709/223 |
| 2006/0136707 | A1 * | 6/2006 | Fukasawa | 713/2 |
| 2006/0233341 | A1 * | 10/2006 | Watanabe et al. | 379/211.02 |

FOREIGN PATENT DOCUMENTS

| CN | 1317768 | 10/2001 |
|---|---|---|
| JP | H 11-110535 | 4/1999 |
| JP | A 2001-125763 | 5/2001 |
| JP | A 2001-282970 | 10/2001 |

* cited by examiner

Primary Examiner—Robert Beausoliel
Assistant Examiner—Elmira Mehrmanesh
(74) Attorney, Agent, or Firm—Oliff & Berridge, PLC

(57) ABSTRACT

The present invention provides a service processing system that process a service for performing predetermined linkage processing on document data among plural devices connected to a network according to predetermined processing contents. A log generating unit of the service processors generates logs of processing results in the respective service processors. Logs stored in the service processors are received by the log receiving unit of a linkage processing server, whether processing results of service linkage are normal or not is determined by comparing the processing results by a log comparison determination unit, and comparison result data as processing result logs is generated in a comparison determination result generating unit. The comparison result data is transmitted to a client terminal making a request to transmit linkage processing results.

16 Claims, 19 Drawing Sheets

FIG. 4

I/F INFORMATION

| SERVICE INFORMATION |
|---|
| SERVICE NAME |
| SERVICE ICON |
| SERVICE LOCATION INFORMATION |
| INPUT |
| OUTPUT |
| PARAMETER LIMITATION RULE |
| SERVICE LOCATION |
| METHOD NAME |
| INVOCATION SCHEME |
| IMPLICIT ELEMENTS |

FIG. 6

INSTRUCTION FORM

| SERVICE INFORMATION |
| :---: |
| SERVICE NAME |
| SERVICE ICON |
| SERVICE LOCATION INFORMATION |
| INPUT |
| OUTPUT |
| PARAMETER LIMITATION RULE |
| SERVICE LOCATION |
| METHOD NAME |
| INVOCATION SCHEME |
| IMPLICIT ELEMENTS |
| FLOW<br>(INVOCATION, MAP, METHOD)<br>(CONTROL STRUCTURE,<br>LOGICAL CALCULATION) |

FIG. 11

| NO. | JOB ID | SERVICE ID | INPUT SOURCE | SERVICE LINKAGE CONTENTS | JOB CONTENTS | START TIME | REQUIRED TIME | STATUS | ERROR CONTENTS |
|---|---|---|---|---|---|---|---|---|---|
| 1 | 0026 | 002 | MULTI-FUNCTION DEVICE | ○△□×××× | ×××× | 11-6: 11:57AM | 43 SEC | NORMAL | — |
| 2 | 0027 | 003 | IMAGE PROCESSOR | ○○△□○× | ×××× | 11-6: 2:25PM | 20 SEC | NORMAL | — |
| 3 | 0028 | 004 | DOCUMENT MANAGEMENT SERVER | ×××○×× | ×××× | 11-6: 4:50PM | 45 SEC | NORMAL | — |
| 4 | 0029 | 007 | MULTI-FUNCTION DEVICE | ×××○×× | ×××× | 11-7: 11:57AM | 44 SEC | ERROR | COMMUNICATION ERROR |
| ...... | | | | | | | | | |

FIG. 13

| SERVICE ID | SERVICE STATUS | DEVICE LOG | START TIME | STATUS | FIRST SERVICE LOG | START TIME | STATUS | SECOND SERVICE LOG | START TIME | STATUS | THIRD SERVICE LOG | START TIME | STATUS |
|---|---|---|---|---|---|---|---|---|---|---|---|---|---|
| 001 | NORMAL | MULTI-FUNCTION DEVICE | 11-6:11:57 | NORMAL | IMAGE PROCESSOR | 11-6:12:02 | NORMAL | DOCUMENT MANAGEMENT SERVER | 11-6:12:04 | NORMAL | DOCUMENT DISTRIBUTION SERVER | 11-6:12:08 | NORMAL |
| 002 | NORMAL | CLIENT TERMINAL | 11-6:13:24 | NORMAL | MULTI-FUNCTION DEVICE | 11-6:13:25PM | NORMAL | IMAGE PROCESSOR | 11-6:13:28 | NORMAL | CLIENT TERMINAL | 11-6:13:30 | NORMAL |
| 003 | NORMAL | DOCUMENT MANAGEMENT SERVER | 11-6:14:50 | NORMAL | DOCUMENT MANAGEMENT SERVER | 11-6:14:51 | NORMAL | DOCUMENT MANAGEMENT SERVER | 11-6:14:52 | NORMAL | DOCUMENT MANAGEMENT SERVER | 11-6:14:55 | NORMAL |
| 004 | AB-NORMAL | MULTI-FUNCTION DEVICE | 11-7:11:57 | NORMAL | IMAGE PROCESSOR | 11-7:11:58 | NORMAL | DOCUMENT MANAGEMENT SERVER | 11-7:12:00 | NORMAL | DOCUMENT DISTRIBUTION SERVER | — | — |

SERVICE PROCESSING SYSTEM, PROCESSING RESULT MANAGEMENT DEVICE AND PROCESSING RESULT CHECKING METHOD OF SERVICE PROCESSING SYSTEM

BACKGROUND OF THE INVENTION

1. Field of the Invention

The present invention relates to a service processing system, a processing result checking method of the service processing system, and more particularly to a service processing system that generates a work flow for paper documents converted into electronic documents, a processing result checking method of the service processing system.

2. Description of Related Art

There is a proposed work flow system in which a scanner, facsimile, copying device, or multi-function device combining them, personal computer, mail server, and the like are connected with each other over a network to share paper documents and electronic information among them.

With the advance of Internet technologies, Web services are proposed which easily perform more advanced task processing by linking applications developed independently of each other. The Web services make it possible to easily create more advanced task systems by use of applications on a network as service components. By linking and combining these services, new services are created.

For example, according to technology described in JP-A-2001-282970, a work flow management system is proposed which defines a work flow representative of a task processing configuration in which information processors such as workstations (WS) and. personal computers (PC) connected to networks such as LAN and WAN are used to execute tasks having a continuous flow with involvement of plural operators through mutual exchange of electronic mail, electronic documents, and task related data among the information processors. The work flow management system also includes a work flow server device that issues individual task commands on the basis of the definition, and keeps track of and monitors the progress of the individual tasks, and a work flow client device that receives task commands issued from the work flow server device and executes the tasks, wherein the client device includes a batch processing type task execution part that automatically invokes task application programs, The work flow management system further includes a part that reports the execution results to the work flow server device, and wherein the work flow server device includes a work flow execution control part that evaluates the execution results of the batch processing type tasks, reported from the client device, on the basis of predefined evaluation conditions, and controls the work flow according to the evaluation result. By the work flow management system thus configured, a batch processing type work flow activity to let the information processors, automatically execute the task application programs can be efficiently included in the work flow tasks.

However, when a system such as a paperless facsimile using a device is included in processing included in a work flow, in cases where a facsimile document received in the device is to be processed by service on a computer and distributed (print, mail, folder storage, etc.), sometimes, due to a communication fault or the like, only communication history exists on the device and the received document does not exist. In such cases, there is a problem in that job is not invoked by the service on the computer and the user cannot immediately recognize the occurrence of the fault.

Also, if a data input error occurs during image reading or mail receiving, job is not invoked.

To avoid such a situation, an arrangement and settings are required to report faults in input sources.

However, this would require fault monitoring and notification by service on individual computers for faults after job invocation, making setting operations complicated. Since various input errors are reported, it is difficult to selectively report only specific input errors.

SUMMARY OF THE INVENTION

The present invention has been made to address the above problem and provides a service processing system, and a processing result checking method of the service processing system that process a service for performing predetermined processing on document data through the linkage among plural devices connected to a network according to predetermined processing contents.

According to an aspect of the present invention, a service processing system processing a service for performing predetermined linkage processing on document data over a network includes: plural service processing devices including: a processor that performs specific processing of the service; and a memory that stores processing result logs of the processor; and a processing result management device including: an receiver that receives the processing result logs stored in the memory; and a generator that generates service result information indicating whether linkage processing of the service has terminated normally, on the basis of the processing result logs of the plural service processing devices.

According to another aspect of the present invention, a processing result checking method of a service processing system that processes service for performing predetermined linkage processing on document data among plural service processors connected to a network receives processing result logs in the service processors performing specific processing of the service from the plural service processing devices and generates service result information indicating whether the service has terminated normally, on the basis of the received processing result logs.

According to an aspect of the present invention, a processing result management device in a service processing system processing a service for performing predetermined linkage processing on document data over a network, the processing result management device comprises: an receiver that receives processing result logs of plural service processing devices performing specific processing of the service, stored by the plural service processing devices; and a generating part that generates service result information indicating whether linkage processing of the service has terminated normally, on the basis of the processing result logs of the plural service processing devices.

BRIEF DESCRIPTION OF THE DRAWINGS

Preferred exemplary embodiments of the present invention will be described in detail based on the followings, in which:

FIG. 4 is a diagram showing the configuration, of I/F information;

FIG. 6 is a diagram showing an instruction form formed in XML format;

FIG. 11 is a diagram showing an example of logs generated in a log generating part of service processors;

FIG. 13 is a diagram showing an example of processing result logs of service linkage;

DESCRIPTION OF PREFERRED EMBODIMENTS

Hereinafter, embodiments of the present invention will be described with reference to the drawings.

A description is made of a basic configuration of a document processing system according to a first embodiment of the present invention.

Figure 1:
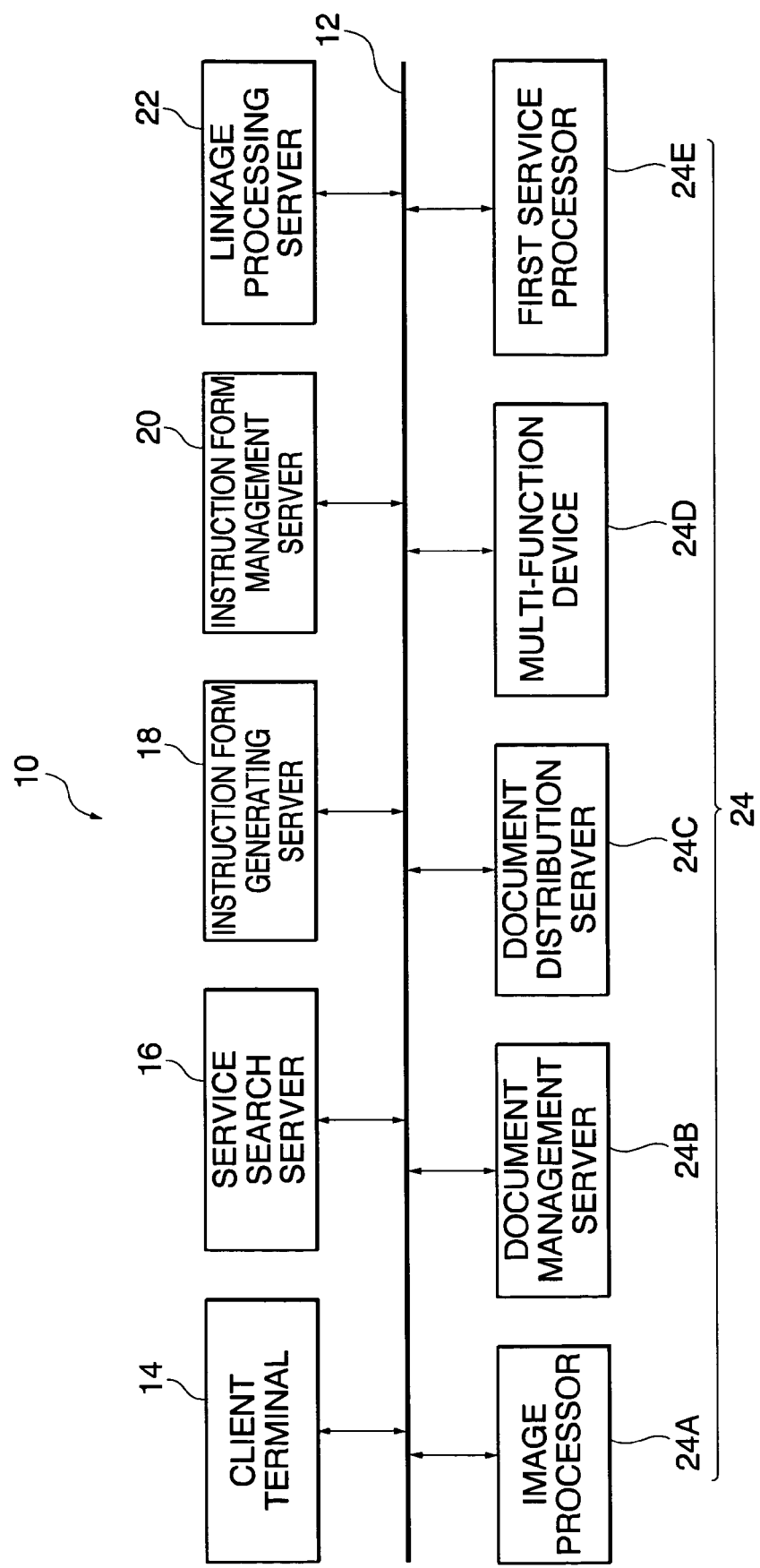
FIG. 1 is a block diagram showing a configuration of a document processing system according to an exemplary embodiment of the present invention.

FIG. 1 is a block diagram showing a configuration of a document processing system 10 according to an embodiment of the present invention.

The document processing system 10 has various services and applications connected over a network 12. The term services refer to functions available on documents, provided in response to a request from the outside. The services include, e.g., copying, printing, scanning, facsimile transmission and reception, mail distribution, storing to a repository, reading from repository, OCR (Optical Character Recognition) processing, noise elimination processing, and the like; the present invention places no special limitations on the services.

The document processing system 10 includes: a client terminal 14 having a user interface through which the user specifies performing desired processing by linking plural services; a service search server 16 searching user's desired services; an instruction form generating server 18 generating an instruction form from information about service linkage specified in the client terminal 14; an instruction form management server 20 managing instruction forms; and a linkage processing server 22 linking services according to an instruction form.

Furthermore, the document processing system 10 includes service processing devices 24 performing specific processing for executing various services, such as an image processor 24A that performs image processing such as exemplary image elimination of image documents, image rotation processing, OCR processing, and image binding; a document management server 24B managing documents; a document distribution server 24C distributing documents; a multi-function device 24D having plural functions of facsimile, printer, scanner, and the like; and a first service processor 24E performing first service processing.

Figure 2:
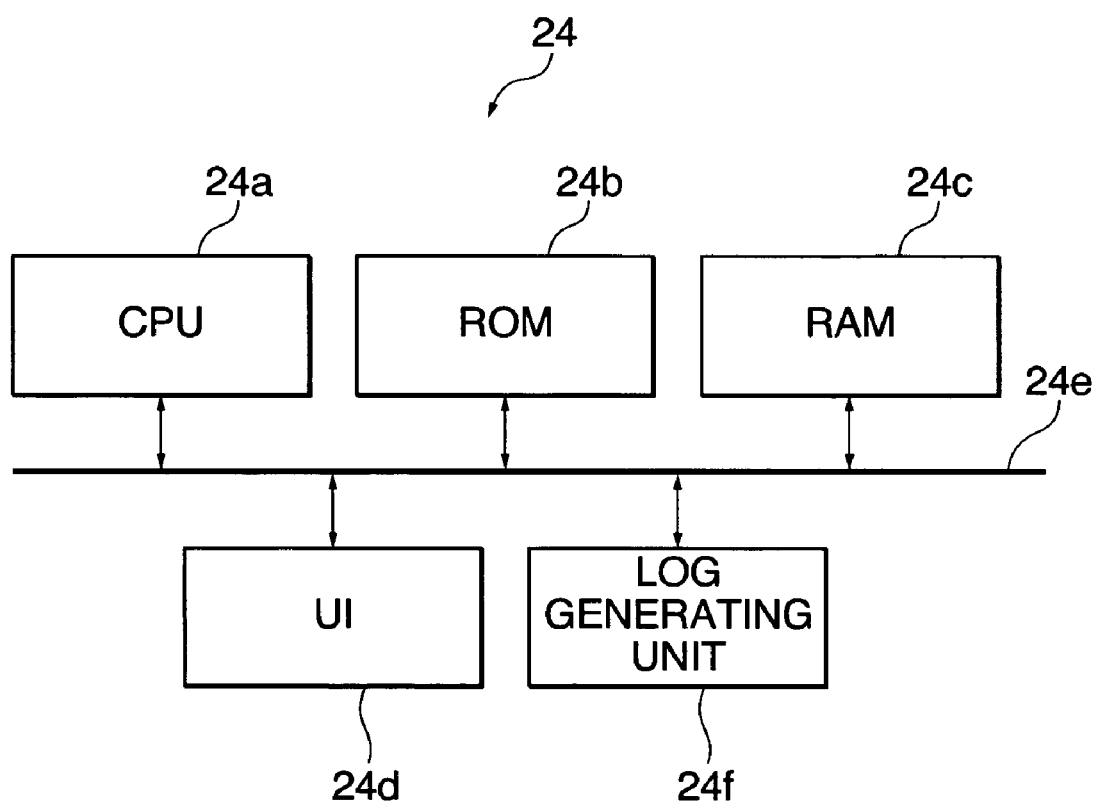
FIG. 2 is a block diagram showing a rough configuration of a service processor.

The service processing devices 24, as shown in FIG. 2, has a microcomputer including a CPU 24a, a ROM 24b, a RAM 24c, and a user interface (UI) 24d that are connected to a bus 24e.

The ROM 24b stores applications and programs for executing various services, programs for executing service linkage, and the like.

In this embodiment, the service processor 24 has a function for storing as logs the results of specific processing performed in it, and a log generating unit 24f generating logs of processing results is connected to the bus 24e. Logs generated by the log generating unit 24f are stored in the RAM 24c. Logs generated by the log generating unit 24f may also be stored in a memory specifically provided.

In this embodiment, the document processing system 10 is configured so that plural servers performing predetermined service processing are connected over the network 12. However, there are no special limitations on the configuration of the document processing system 10, provided that plural services are connected over the network 12.

The term instruction form refers to, when a series of processing is broken down into plural functional processes, data including information representing relationships among the functions. Information such as exemplary interface (I/F) information for calling the functions, and information for forming a graphical user interface (GUI) on the series of processes could be included in the instruction form.

Figure 3:
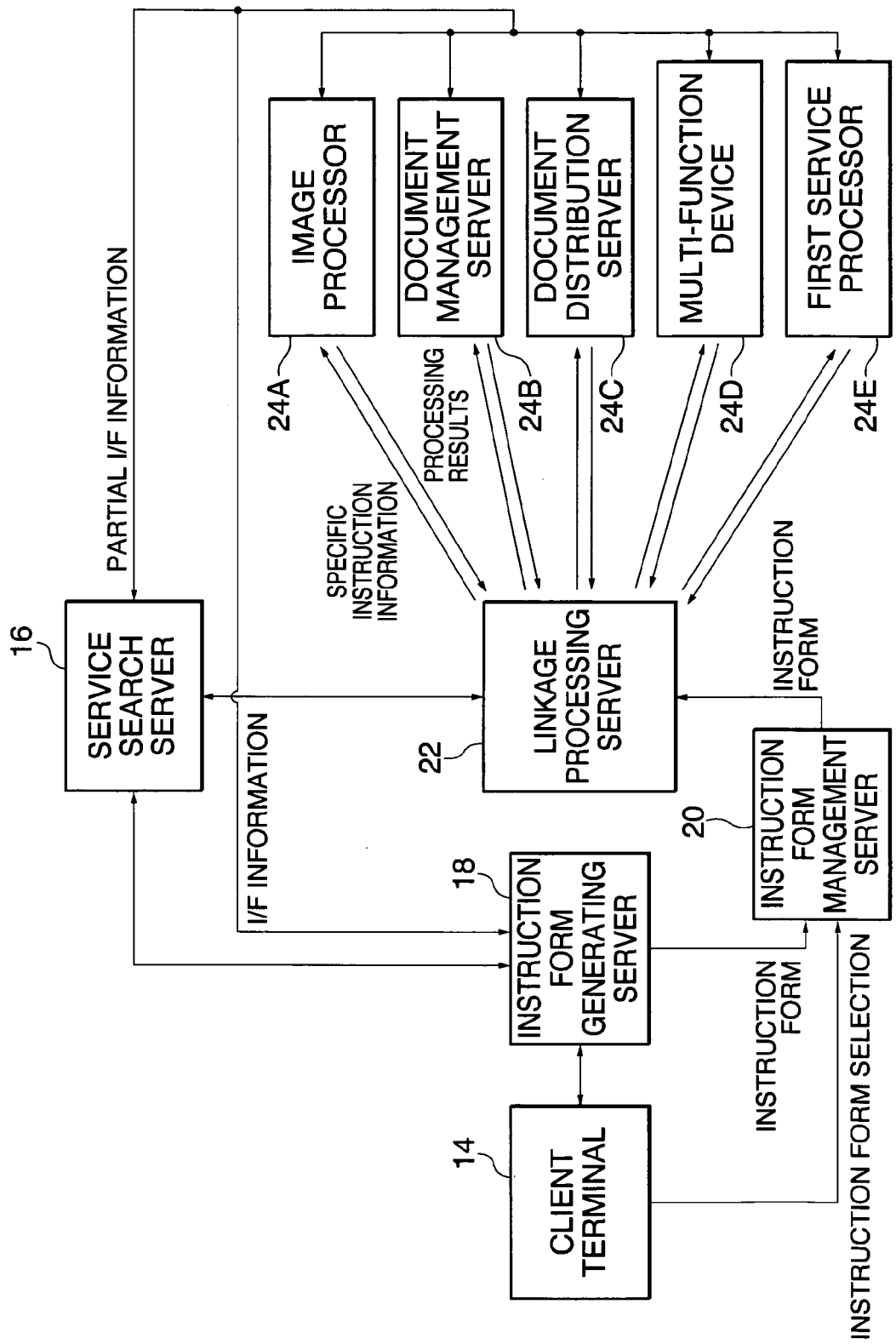
FIG. 3 is a block diagram for explaining the interrelationship among service processors making up a document processing system according to the first embodiment of the present invention.

FIG. 3 is a block diagram for explaining the interrelationship among the service processing devices 24 of the document processing system 10. The service processing devices 24 store I/F information representing the contents of services provided by themselves.

FIG. 4 is a conceptual diagram showing the configuration of I/F information. The I/F information includes <service class>, <service name>, <service icon>, <service location information>, <input>, <output>, <parameter restriction rules>, <service location>, <method name>, <invocation scheme>, and <implicit elements>.

<service class> indicates the class of service provided by the service processing devices 24. As <service class>, a class defined in advance such as scan, print, repository, and a flow is used. <service name> is the name of service provided by the service processing devices 24. <service icon> indicates position information of an icon displayed in GUI of the client terminal 10.

<service location information> indicates URL used to receive I/F information by the instruction form generating server 18. <input> indicates input to service. <output> indicates output from service. <parameter restriction rules> indicate restriction rules applied to <input> and <output>. <service location> indicates position information when service is actually applied. <method name> specifies a method of providing service processing and a name indicating the service.

<invocation scheme> indicates a method of invoking service processing. As <invocation scheme>, message switching protocols SOAP (Simple Object Access Protocol), SMTP (Simple Mail Transfer Protocol), and the like can be used. <implicit elements> indicate not data explicitly passed to processing of a following stage as output but data that can be referred to in processing of the following stage.

The client terminal 14 has the function of a graphical user interface (GUI) through which the user directs the generating of an instruction form, and displays a screen and performs required operations to select the instruction form to be invoked, and the function of a user interface (UI) through which the user interprets a fault occurring in the middle of service.

The service search server 16 searches services meeting search conditions from plural services connected to the network 12. The service search server 16 has part of I/F information (hereinafter referred to as partial I/F information) of various service processors such as the image processor 24A, the document management server 24B, the document distribution server 24C, and the first service processors 24D and 24E. The partial I/F information refers to <service information>, <service name>, <service location information>, <input>, and <output information> of the elements of I/F information.

The service search server 16, when search conditions are transmitted from the instruction form generating server 18 and the linkage processing server 22, searches services using the partial I/F information of the service processing devices 24. For example, the service search server 16, when searching the same service as a specified service, may search services matching in <service class>, services matching in <input> and <output>, and services matching in all of them.

The instruction form generating server 18, when generating an instruction form, receives I/F information from the service processing devices 24 and generates an instruction form for linking services provided from the service processing devices 24. The instruction form generating server 18 performs the following processing to generate an instruction form.

The instruction form generating server 18 makes a request to transmit I/F information on individual services from required service processing devices 24 distributed over the network 12 on the basis of <service location information>. If required service processing devices 24 do not exist, the instruction form generating server 18 may command the service search server 16 to search other service processing devices 24 providing the same services that the required service processing devices 24 provide. The instruction form generating server 18 may receive <service location information> of the other service processing devices 24 from the service search server 16.

The instruction form generating server 18 manages search results from the service search server 16 and I/F information received from the service processing devices 24. The instruction form generating server 18 generates a HTML file for generating a GUI screen for defining a job flow on the basis of I/F information received from the service processing devices 24. Upon receipt of a service browsing request from a client terminal 14, the instruction form generating server 18 transmits the HTML file for generating the GUI screen to the client terminal 14.

Figure 5:
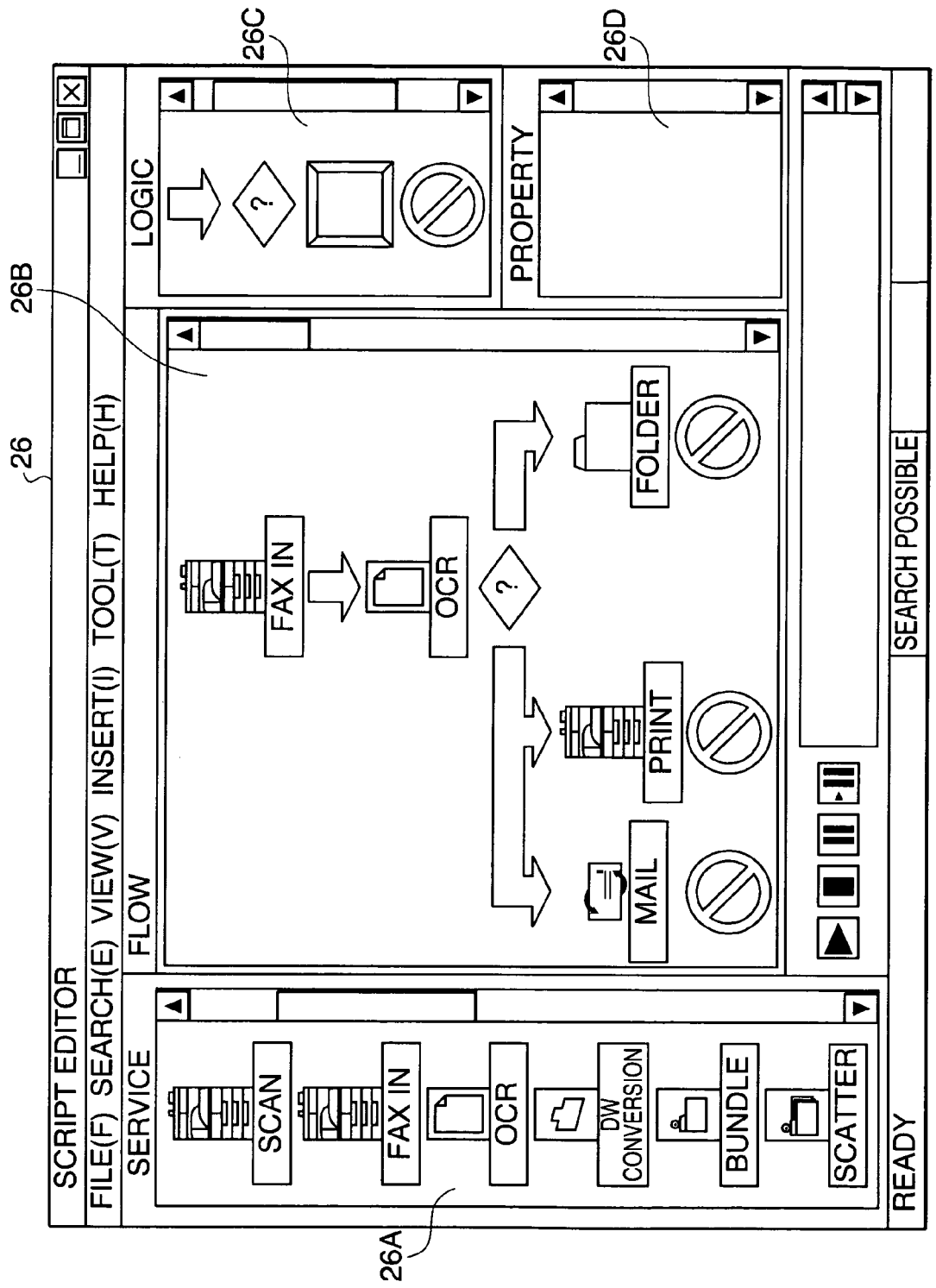
FIG. 5 is a diagram showing an instruction form generating screen, which is a GUI screen for defining a job flow.

FIG. 5 is a diagram showing an instruction form generating screen 26, which is a GUI screen for defining a job flow. The instruction form generating screen 26 is configured with a service window 26A, a flow window 26B, a logic window 26C, and a property window 26D.

The service window 26A displays usable various service processing devices 24. The logic window 26C displays a job flow indicating patterns of linkage among services. The property window 26D displays a detailed setting pattern of icons displayed on the service window 26A and the logic window 26C.

The user can define a job flow in the flow window 26B by dragging and dropping icons of the service window 26A and icons of the logic window 26C to the flow window 26B. The user can set services and a relationship among the services such as logics in detail by editing information displayed in the property window 26D.

The client terminal 14 transmits job flow information defined by the user's operations to the instruction form generating server 18.

The instruction form generating server 18 generates an instruction form defining the contents of processing desired for services, input parameters, a method of linkage among the,services (job flow), and information for identifying a document to be processed, such as a document name and storage location information, on the basis of job flow information about service linkage commands from the user and I/F information of the services. In this embodiment, the instruction form is organized with a file of XML format.

FIG. 6 is a conceptual diagram showing an instruction form formed in XML format. Since the linking of plural services is regarded as one service, the instruction form has <flow> added to the I/F information shown in FIG. 4.

<flow>, which is an element describing the linkage among services, includes <invoke>, <if> and other elements for control structures, logical calculations, and condition determination, operation commands of XML structure for adjusting the linkage among services, information for identifying a document to be processed, and the like.

<invoke> indicates a specific method of the service processing devices 24, and invokes service. <invoke> includes <map> element indicating position information of parameters and <method> element specifying a method name to be invoked. <if>, <and>, <eq>, and <gt> indicating logical structures, logical calculations, and the like make conditional branch during linkage processing and adjust parameters exchanged among services.

An instruction form contains all information about control of service linkage processing in the <flow> element. Thereby, linkage processing itself represented by the instruction form is regarded as one service. The instruction form is not limited to the structure shown in FIG. 6 if services can be linked.

The instruction form generating server 18 transmits an instruction form of XML format as described above to the instruction form management server 20. The instruction form generating server 18 may transmit the instruction form directly to the linkage processing server 22 if the execution of service linkage processing is specified by the user.

The instruction form management server 20 stores an instruction form transmitted from the instruction form generating server 18, and transmits the instruction form to the linkage processing server 22 in response to a request from the client terminal 14.

The linkage processing server 22 interprets and executes a specified instruction form, and against the occurrence of a fault, receives logs of processing results stored in the service processing devices 24 to check processing results of service linkage. Upon receipt of an instruction form, the linkage processing server 22 interprets the instruction form, and according to an instruction form and usage specified in the instruction form, sequentially invokes the service processing devices 24 such as exemplary the image processor 24A, the document management server 24B, and the document distribution server 24C to perform linkage processing. The linkage processing server 22 stores information such as the status of linkage processing in execution and the result of the linkage processing terminated, and reports the status and results of the linkage processing in response to a request from the outside.

The linkage processing server 22, when interpreting an instruction form and making a request to the service processing devices 24, generates specific instruction information including processing request contents, input parameters, information for identifying a document to be processed, a service ID for identifying a job flow (service linkage) by the instruction form, and the like. The linkage processing server 22 may extract information related to service processing before and after processing for linking processing performed in the service processing devices 24 and set it in the instruction form, or may, without taking the form of an instruction form, make a processing request in an information exchange format specific to each of the service processing devices 24.

The linkage processing server 22 receives logs stored in the service processing devices 24 in association with service IDs and manages them.

The image processor 24A is a computer in which a software program having image processing functions is installed. The image processor 24A processes a document on the basis of service processing request contents, input parameters, and information about a document to be processed included in a processing request from the linkage processing server 22. The image processor 24A, when invoked, sends partial I/F information to the service search server 16. The image processor 24A sends I/F information indicating a method of using image processing service in response to a request from the instruction form generating server 18. The I/F information is used when an instruction form is generated.

The document management server 24B has a document storing function. The document management server 24B, on the basis of information contained in a request from the linkage processing server 22, stores and searches documents and Performs attribute change and other processing on the documents. The document management server 24B, when invoked, sends partial I/F information to the service search server 16. The document management server 24B sends I/F, information indicating a method of using document management service in response to a request from the instruction form generating server 18.

The document distribution server 24C stores a received document in a specified document management server, transmits mail and fax to a specified transmitting destination, and performs printout processing for a specified printer. The document distribution server 24C, in response to a request from the linkage processing server 22, performs document distribution processing on the basis of information of a document specified in the client terminal 14 and its distribution destination. The document distribution server 24C, when invoked, sends partial I/F information to the service search server 16. The document distribution server 24C sends I/F information indicating a method of using distribution processing service in response to a request from the instruction form generating server 18.

The multi-function device 24D transmits received documents with a facsimile and prints them. The multi-function device 24D performs service processing such as facsimile transmission and printing to be performed in the device on the basis of processing request contents from the linkage processing server 22, input parameters, information for identifying a document to be processed, and other information. The multi-function device 24D, when invoked, sends partial I/F information to the service search server 16. The multi-function device 24D sends I/F information indicating a method of using service processing in response to a request from the instruction form generating server 18. The multi-function device 24D may be a facsimile connected over a public line.

The first service processor 24E performs predetermined service processing on documents according to commands from the outside. The first service processor 24E performs service processing to be performed in the device on the basis of processing request contents from the linkage processing server 22, input parameters, information for identifying a document to be processed, and other information. The first service processor 24E, when invoked, sends partial I/F information to the service search server 16. The first service processor 24E sends I/F information indicating a method of using service processing in response to a request from the instruction form generating server 18.

Figure 7:
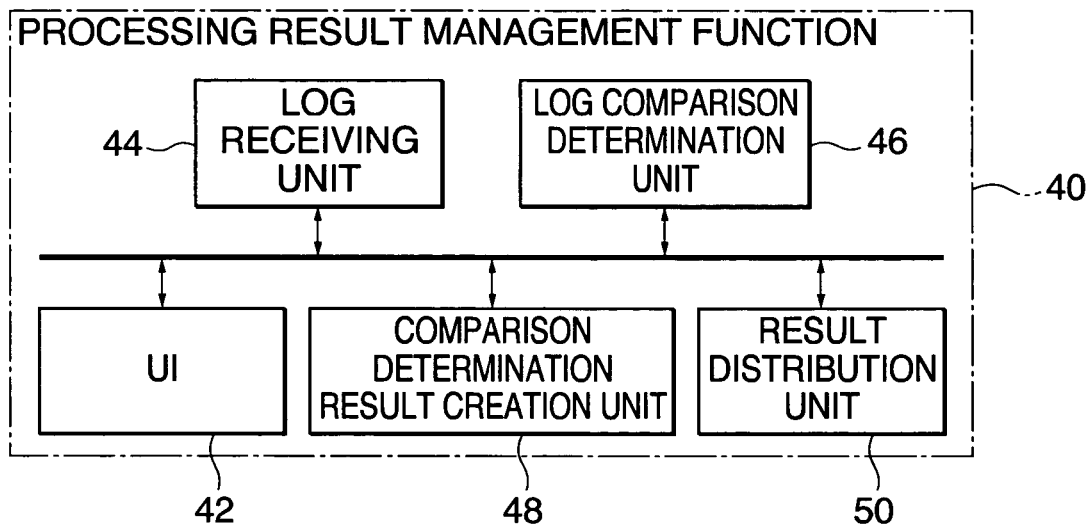
FIG. 7 is a block diagram showing the configuration of a processing result management function included in a linkage processing server of the first embodiment.

The linkage processing server 22 of this embodiment has a processing result management function for checking whether the service processing devices 24 normally terminate processing, when linking services using the service processing devices 24. As shown in FIG. 7, the linkage processing server 22 has a processing result management function 40 including: a user interface (UI) 42 through which a command is issued to check whether specific processing of the service processing devices 24 normally terminate processing, and the result of the checking is displayed; a log receiving unit 44 that receives logs stored in the service processing devices 24; a log comparison determination unit 46 that determines whether service linkage terminates normally, from logs received by the log receiving unit 44; a comparison determination result generating unit 48 that generates service linkage logs representing comparison determination results of a given format from comparison determination results of the log comparison determination unit 46; and a result distribution unit 50 that stores service linkage logs in a predetermined folder, transmits them by mail, and performs other processing.

The linkage processing server 22 receives logs of the service processing devices 24 stored in association with service ID, and can determine whether service linkage corresponding to a desired service ID terminates normally.

The parts of the processing result management function 40 may be configured in hardware or with software programs.

In the document processing system 10 configured as described above, the service processing devices 24 such as the image processor 24A, the document management server 24B, the document distribution server 24C operate as follows when application programs for executing their respective predetermined services are installed.

The service processing devices 24 such as the image processor 24A, the document management server 24B, the document distribution server 24C, a first service processor 24D, and a second service processor 24E, in invocation processing, send I/F information containing their respective service summary and address information to the service search server 16.

The service search server 16 stores partial I/F information transmitted from the service processing devices 24 such as the image processor 24A, the document management server 24B, the document distribution server 24C, the first service processor 24D, and the second service processor 24E. Thereby, the service search server 16 can perform search using partial I/F information when predetermined service search requests are issued from the instruction form generating server 18 and the linkage processing server 22, for example.

Figure 8:
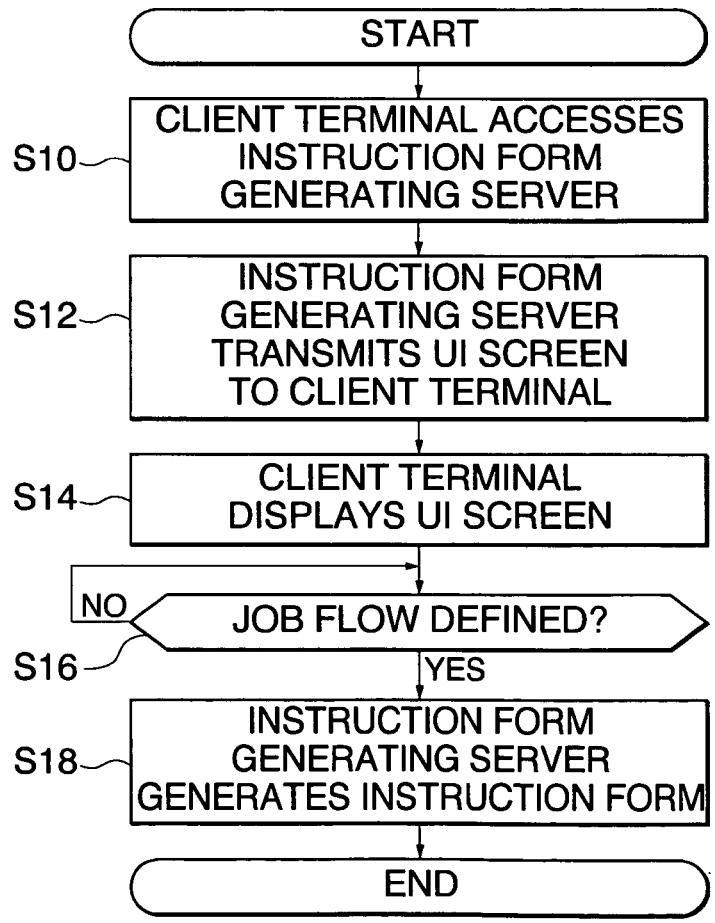
FIG. 8 is a flowchart showing a processing procedure of a client terminal and an instruction form generating server when an instruction form is generated.

FIG. 8 is a flowchart showing a processing procedure of the client terminal 14 and the instruction form generating server 18 when an instruction form is generated.

The client terminal 14 accesses URL (Uniform Resource Locator) of HTML file generated for a user interface screen provided by the instruction form generating server 18 through an installed browser according to the user's operations (step S10).

The instruction form generating server 18 transmits the HTML file of the user interface screen to the client terminal 14 in response to a browsing request from the client terminal 14 (step S12).

The client terminal 14 displays a user interface screen on the basis of information making up a screen contained in, e.g., an HTML file, transmitted from the instruction form generating server 18 (step S14). The user can define a job flow of desired service linkage by use of the user interface screen displayed in the client terminal 14.

The client terminal 14 determines whether a job flow is defined, through the user interface screen, and waits until a job flow is defined (step S16). On determining that a job flow has been generated, the client terminal 14 transmits job flow information about service linkage defined by the user to the instruction form generating server 18.

The instruction form generating server 18 generates an instruction form defining the contents of processing desired for services, input parameters, a method of linkage among the services, a document name, storage location information, information (service ID) for identifying a document to be processed, and other information, on the basis of job flow information of service linkage transmitted from the client terminal 14 and I/F information received from the service processing devices 24 (step S18). The instruction form generating server 18 transmits the instruction form of XML format to the instruction form management server 20.

The instruction form management server 20 stores the instruction form generated in the instruction form generating server 18. The instruction form management server 20 stores plural instruction forms generated by the instruction form generating server 18 and reads an instruction form specified to be selected from the client terminal 14.

The user selects a desired instruction form from plural instruction forms stored in the instruction form management server 20 to invoke linkage processing. Details are given below.

Figure 9:
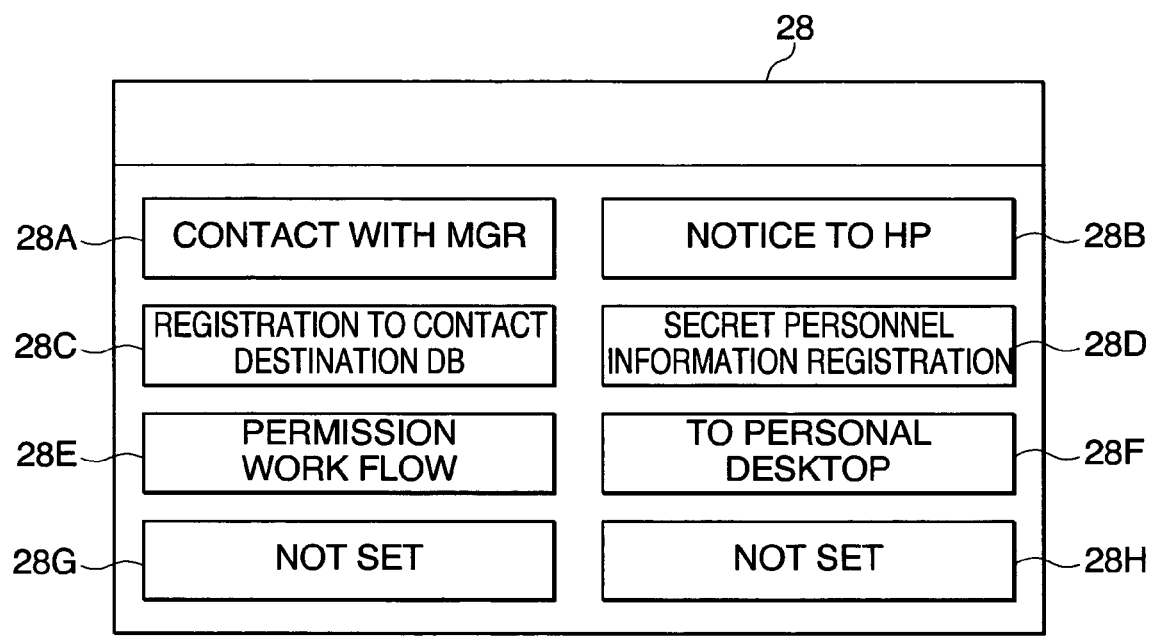
FIG. 9 is a diagram showing an example of a service linkage processing selection screen representing an instruction form list.

The client terminal 14 accesses the instruction form management server 20 to receive an instruction form list managed in the instruction form management server 20. For example, the client terminal 14 receives a service linkage selection screen 28 displaying an instruction form list as shown in FIG. 9, and selects a desired instruction form. An instruction form can be selected, for example, by the user selecting a button corresponding to a desired instruction form from buttons 28A to 28H for selecting instruction forms, which are respectively provided for the instruction forms of the service linkage selection screen 28.

The client terminal 14 selects an instruction form indicating predetermined service linkage processing from the service linkage selection screen 28 according to the user's operation commands, and directs the invocation of the instruction form. The client terminal 14 displays a parameter input screen to the user as required and receives parameters required for job execution.

The instruction form management server 20 sends the instruction form specified by the client terminal to the linkage processing server 22. As a result, the linkage processing server 22 starts linkage processing.

The linkage processing server 22 interprets the instruction form sent from the instruction form management server 20 and requests a service processor 24 specified in the instruction form to perform specific processing. The linkage processing server 22, on the basis of information contained in the instruction form, extracts the location of a service processor 24 requested for processing, input and output parameters required for the processing request, a method name for the processing request, an invocation scheme, and information for identifying a document to be processed, and generates specific instruction information and a service ID. The linkage processing server 22 transmits the specific instruction information and the service ID to the service processing devices 24 described in the instruction form. The linkage processing server 22 requests the service processing devices 24 to execute service processing in the order according to the instruction form.

Figure 10:
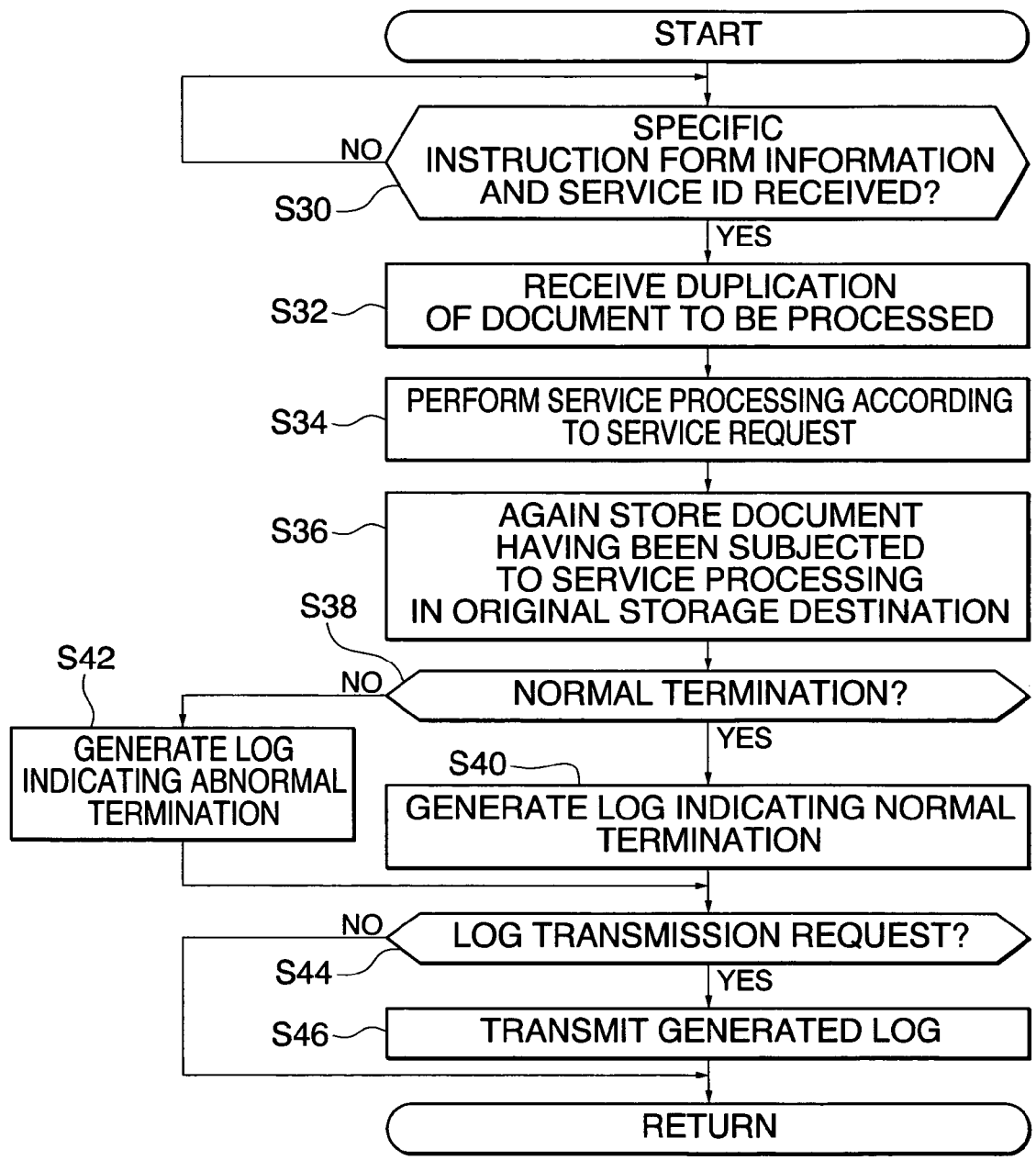
FIG. 10 is a flowchart showing an example of processing performed in a service processor of the first embodiment.

A description is made of an example of processing performed in the service processor 24 with reference to a flowchart of FIG. 10.

The service processor 24 determines whether it has received the specific instruction information and service ID sent from the linkage processing server 22, and waits until receiving them (S32). The service processing devices 24 generates a duplication of a document to be processed, on the basis of on the storage destination location information of the document to be processed, described in the specific instruction information, and receives the document. (S32) The service processor 24 interprets the service processing request specified in the specific instruction information and performs service processing for the received document (S34), and again stores the document having been subjected to the service processing in the original storage destination (S36).

The service processor 24 determines whether the specific processing based on the service processing request has terminated normally (S38), and if so, generates a log indicating normal termination in the log generating unit 24*f* (S40); otherwise, generates a log indicating abnormal termination in the log generating unit 24*f* (S42). These logs are stored in the RAM 24*c* of the service processing devices 24.

For example, the log generating unit 24*f* of the service processing devices 24, as shown in FIG. 11, logs a job ID for identifying processing in the specified device, a service ID for identifying service linkage, a data input source (e.g., facsimile, scanner, etc.), service linkage contents, processing contents (job contents) of the specified device, start time, required time, status (normal termination, abnormal termination, etc.), error contents (e.g., timeout, etc.) at abnormal termination, and the like.

It is determined whether a request to transmit the generated log is issued from the linkage processing server 22 (S44), and if an transmission request exists, the generated log is transmitted to the linkage processing server 22 (S46).

In this way, the service processing devices 24 store processing results of the specified device, and the processing results are transferred to the linkage processing server 22 if requested by the user through the UI 42 of the linkage processing server 22. Accordingly, the linkage processing server 22 can recognize a processing state during service linkage from logs of the service processing devices 24.

Figure 12:
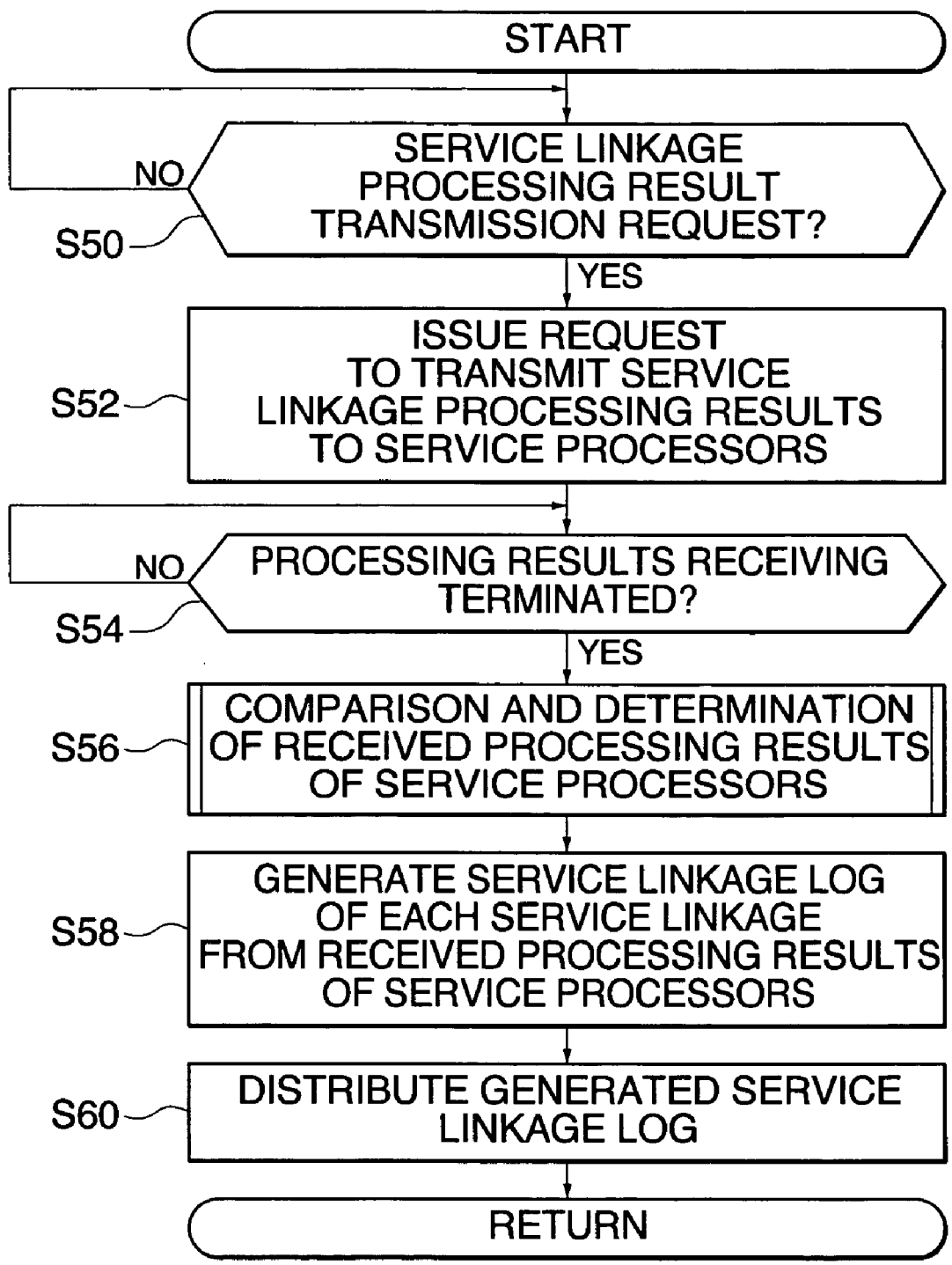
FIG. 12 is a flowchart showing the flow of processing result checking during service linkage performed in a linkage processing server of the first embodiment.

A description is made of the checking of processing results during service linkage in the linkage processing server 22, with reference to a flowchart of FIG. 12.

The linkage processing server 22 determines whether a request to transmit processing results of service linkage is made, and waits until the request is made (S50). The service linkage processing result transmission request can be made, for example, through the network 12 and the UI 42 of the linkage processing server 22. The service linkage processing result transmission request can also be made directly from the UI 42 of the linkage processing server 22.

Upon receipt of the service linkage processing result transmission request, the linkage processing server 22 issues a request to transmit service linkage processing results to the service processing devices 24 connected to the network 12 (S52), determines whether the log receiving unit 44 has received service linkage processing results, and otherwise waits until receiving service linkage processing results (S54).

Upon receiving service linkage processing results, the linkage processing server 22, in the log comparison determination unit 46, performs log comparison determination processing to determine whether processing of each service linkage terminates normally, on the basis of the received logs of the service processing devices 24 (S56). It can be determined whether all service linkages have terminated normally by referring to and comparing results of specific processing of the service processing devices 24 for each of service IDs.

The linkage processing server 22 generates a service linkage log of each service linkage from the received results of specific processing of the service processor 24 (S58). For example, as shown in FIG. 13, logs of the service processors and service linkage logs (service status) are generated for each service ID. In this case, only for service linkage not normally terminated, service linkage logs may be generated, and it can be determined whether service linkage,has terminated normally, by extracting only service linkage logs of service linkage not normally terminated. FIG. 13 shows logs of the service processing devices 24 performing specific processing making up service linkage and service linkage logs each generated as processing results of service linkage itself. By referring to the service linkage logs, it can be determined whether service linkage terminates normally. It will be understood from FIG. 13 that all service linkages of service IDs 001 to 003 terminated normally, and service linkage of service ID 004 failed in document distribution by the document distribution server 24C of a third service. In this example, the log comparison determination unit 46 of the linkage processing server 22 compares device logs with logs of the service processors and thereby determines that a log of the document distribution server 24C does not exist. Accordingly, it is appreciated that the service linkage of service ID 004 failed in document distribution of third service.

The contents of service linkage logs are not limited to those displayed in FIG. 13. Log contents of the service processing devices 24 may be incorporated as required.

The linkage processing server 22 distributes the generated service linkage logs (S60). For example, when a request to transmit service linkage processing results is issued from the client terminal 14, service linkage logs generated in the linkage processing server 22 are distributed to the client terminal 14, stored in a specified folder of the client terminal 14, or printed to the multi-function device 24D. In other words, the user can determine whether service linkage has terminated normally, by referring to the distributed service linkage logs. For abnormal termination, a failed service processor 24 can be located from the service linkage logs, and the service linkage can be performed again from the failed service processor 24.

Next, the checking of service linkage, processing results performed as described above is described using an example.

Figure 14:
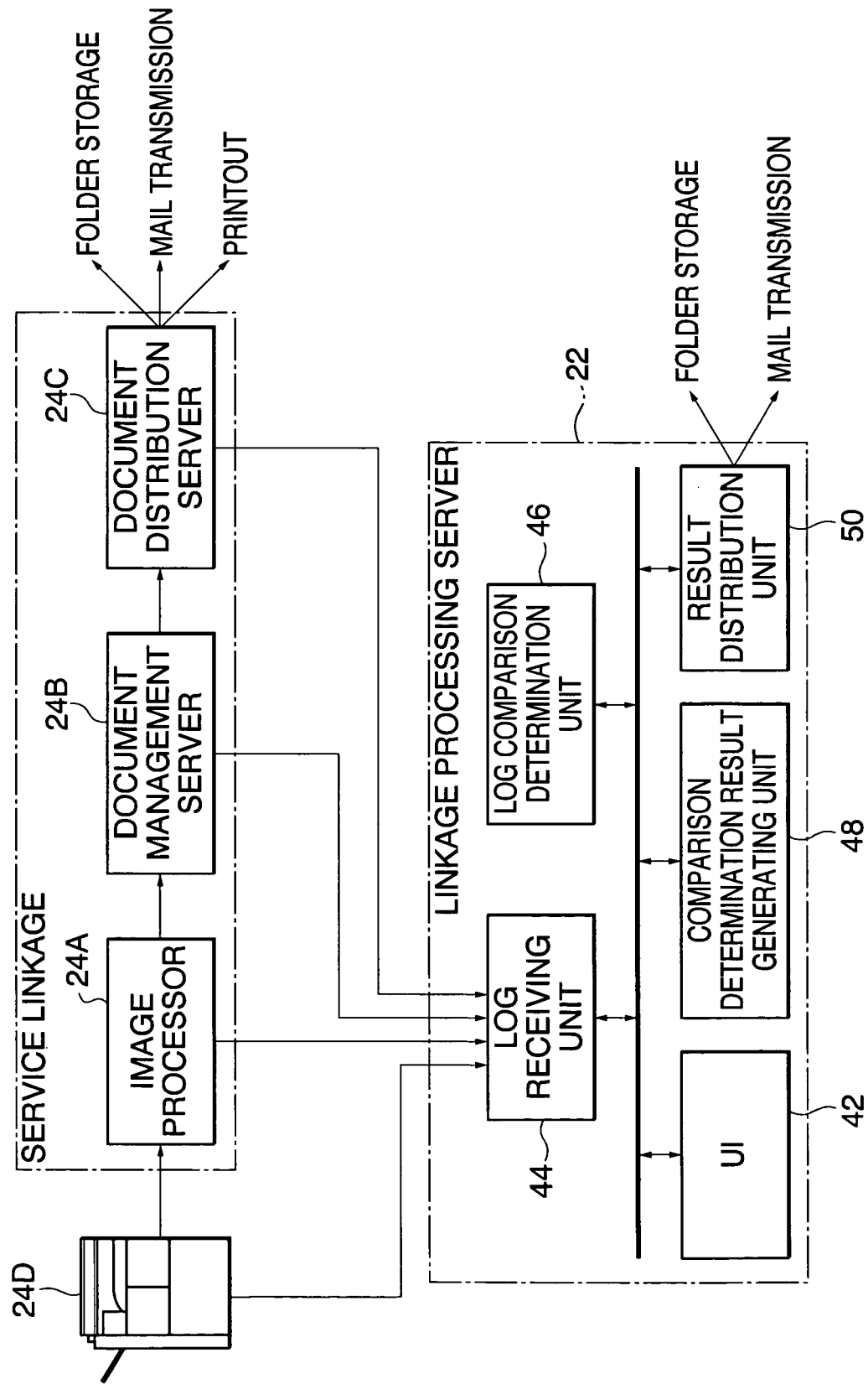
FIG. 14 is a block diagram showing the interrelationship among devices during processing result checking of service linkage in a document processing system according to the first embodiment of the present invention.

FIG. 14 shows a relationship among the multi-function device 24D, the image processor 24A, the document management server 24B, and the document distribution server 24C when a request is made to the image processor 24A, the document management server 24B, and the document distribution server 24C to perform service linkage for image data received by reading images by the scanner function of the multi-function device 24D or as a result of facsimile receive. That is, this example shows service linkage corresponding to the service ID 004 of FIG. 13.

The service processing devices 24 operate as described above. In the service processing devices 24, logs of processing results in the respective service processing devices 24 are generated by the log generating unit 24f, and stored in association with a service ID. Logs as shown in FIG. 11 are generated in the respective service processing devices 24 and stored.

When a request to transmit service linkage processing results is made through the UI 42 of the linkage processing server 22, logs stored in the service processing devices 24 are received by the log receiving unit 44 of the linkage processing server 22, whether processing results of service linkage are normal or not is determined by comparing the processing results on a service ID basis by the log comparison determination unit 46, and service linkage logs as shown in FIG. 13 are generated in the comparison determination result generating unit 48. Only abnormal processing results of service linkage may be extracted to generate service linkage logs, whereby whether service linkage terminated normally can be determined.

The service linkage logs generated in the comparison determination result generating unit 48 are transmitted to a folder of the client terminal 14 making a request to transmit linkage processing results, or transmitted by mail.

Accordingly, the user can receive a service linkage log for each service linkage by use of the client terminal 14 to make a request to transmit service linkage processing results, and thereby never fails to determine whether service linkage terminates normally. For example, in FIG. 13, as described above, since no document distribution is made in the third service of service ID 004, it is recognized that service linkage corresponding to the service ID 004 is not done normally up to the end, and the document, distribution can be performed again.

The instruction form generating server 18, the instruction form management server 20, and the linkage processing server 22 of the document processing system 10 according to the first embodiment are respectively described as discrete devices connected to the network 12. However, these functions may be incorporated in the multi-function device 24D and the like. In this embodiment, the network 12 may be a public line; for example, a facsimile may be configured as the, discrete device so that logs are transmitted to the linkage processing server 22 and the like over a telephone line.

A second embodiment of the present invention is described. Members in the second embodiment that are identical to members in the first embodiment are identified by the same reference numerals, and are excluded from detailed descriptions.

Figure 15:
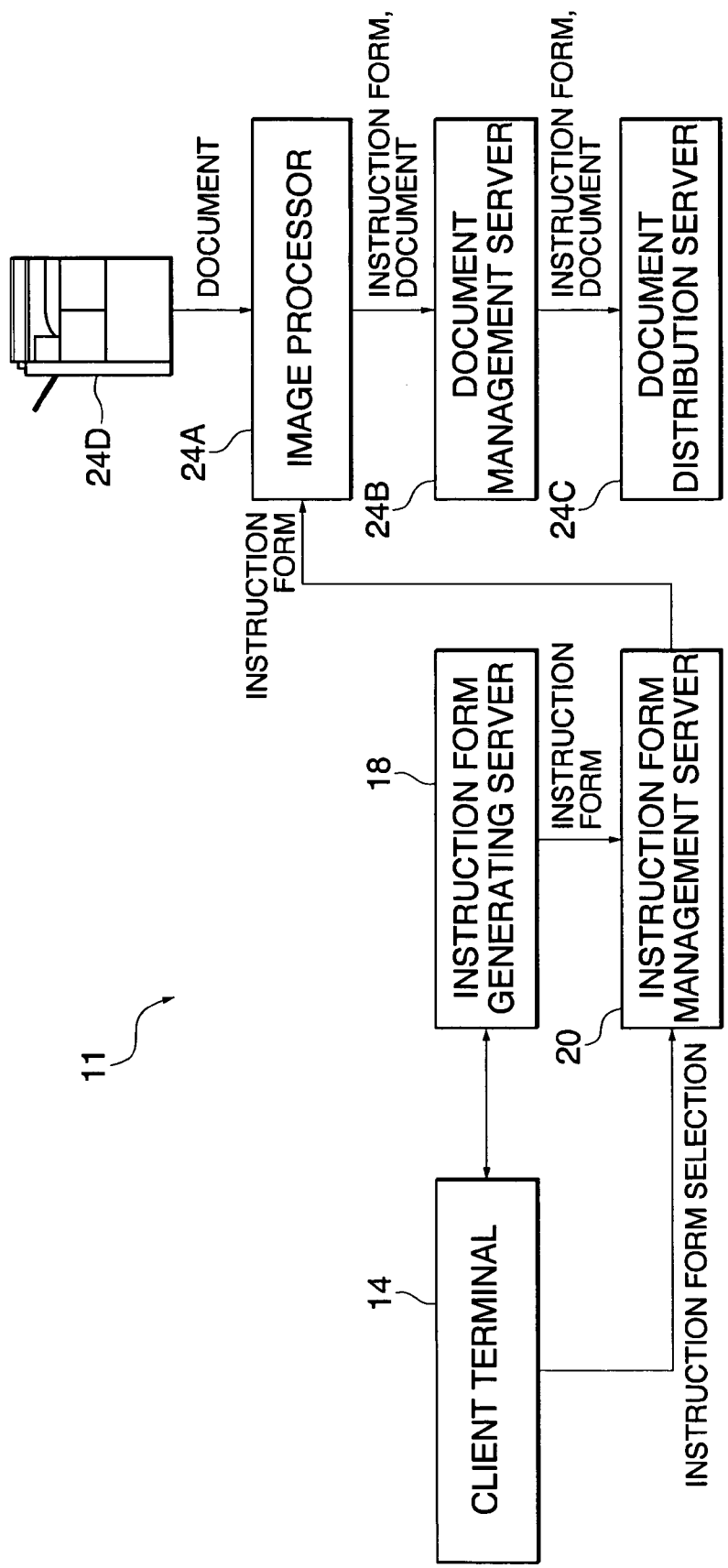
FIG. 15 is a block diagram for explaining the interrelationship among service processors making up a document processing system according to a second embodiment of the present invention.

FIG. 15 is a block diagram for explaining the interrelationship among service processors making up a document processing system 11 according to the second embodiment. The document processing system 11 according to the second embodiment can link plural services without using the linkage processing server 22 described in the first embodiment.

Although the document processing system 11 includes the service processing devices 24 (except the linkage processing server 22) described in the first embodiment, only service processing devices 24, concerned in linkage processing are shown in FIG. 15.

In the document processing system 11 in the second embodiment, documents to be subjected to service linkage are received from the multi-function device 24D.

The multi-function device 24D in the second embodiment has a function for managing processing results on a service linkage basis like the linkage processing server 22 in the first embodiment.

Figure 16:
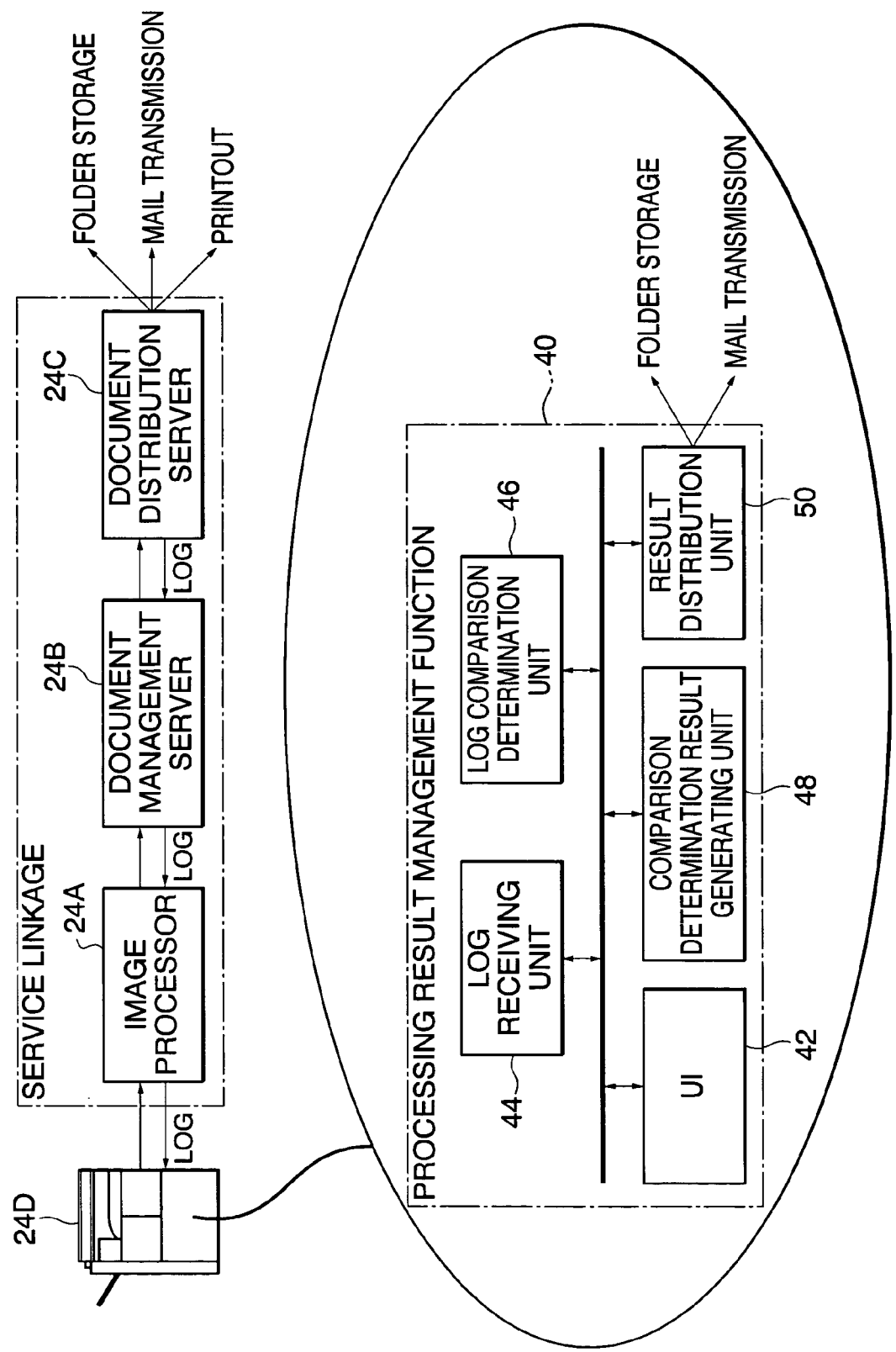
FIG. 16 is a block diagram showing the interrelationship among devices during processing result checking of service linkage in a document processing system according to the second embodiment of the present invention.

As shown in FIG. 16, the multi-function device 24D has the processing result management function 40. As described in the first embodiment, the processing result management function 40 includes: the user interface (UI) 42 through which a command is issued to check whether specific processing of the service processing devices 24 normally terminate processing, and the result of the checking is displayed; the log receiving unit 44 that receives logs stored in the service processing devices 24; the log comparison determination unit 46 that determines whether service linkage terminates normally, from logs received by the log, receiving unit 44; the comparison determination result generating unit 48 that generates service linkage logs representing comparison determination results of a given format from comparison determination results of the log comparison determination unit 46; and the result distribution unit 50 that stores service linkage logs in a predetermined folder, transmits mail, and performs other processing.

The parts of the processing result management function 40 in this embodiment,may be configured in hardware or with software programs.

The service processing devices 24 store logs generated by the log generating unit 24f in the RAM 24c, as described in the first embodiment. In this embodiment, during service linkage, as shown in FIG. 16, a log corresponding to the service linkage is associated with a service. ID and transmitted to a service processor 24 of a preceding stage, and a service processor 24 acquiring the log in turn transmits it to a service processor 24 of a further preceding stage; ultimately, the log receiving unit 44 of the multi-function device 24D will receive all logs of the service processing devices 24 concerned in the service linkage.

The user can select a desired instruction form from plural instruction forms stored in the instruction form management server 20 to invoke linkage processing. Details are given below.

The client terminal 14 selects an instruction form representing desired service linkage processing from a service linkage processing selection screen according to the user's operations and directs the invocation of the instruction form. The instruction form management server 20 transmits the instruction form specified by the client terminal 14 to the image processor 24A.

The image processor 24A receives a document to be processed from the multi-function device 24D on the basis of information about the storage location of the document to be processed, described in the transmitted instruction form. The document to be processed is image information received by facsimile receive, a scanner function, or the like of the multi-function device 24D.

The image processor 24A, for the received document image, interprets a service processing request, performs image processing such as noise elimination and OCR processing, and binds the processed image with an extracted text document. The image processor 24A, after the termination of predetermined image processing, deletes the service processing request described in the instruction form. The image processor 24A transmits a document in which the image document received by the image processing and the text document are bound, and the instruction form containing processing results such as processing status information (completion), output parameters, and information about a storage destination of the document after the processing to the document management server 24B providing a next service processor 24.

The image processor 24A, after predetermined image processing, may modify or delete a service request to the device itself, described in the instruction form, before transmitting the instruction form to the document management server 24B. Furthermore, the image processor 24A, after predetermined image processing, may transmit the instruction form to a next service processor 24.

The image processor 24A generates a log as a result of specific processing in the service linkage in the log generating unit 24f, associates the log with a service ID, and transmits it to the multi-function device 24D.

The document management server 24B temporarily stores the document transmitted from the image processor 24A in a storage destination described in the instruction form. The document management server 24B transmits the document and the instruction form to the document distribution server 24C to perform next service processing. The document management server 24B generates a log as a result of specific processing in the service linkage in the log generating unit 24f, associates the log with the service ID, and transmits the log to the multi-function device 24D through the image processor 24A, which is a service processor 24 of a preceding stage.

The document distribution server 24C, on the basis of the instruction form, transmits only the text document of the document in which the text document and the image document are bound, to a mail address specified as a distribution destination, and transmits only the image document to a specified FAX number with a facsimile. Upon recognizing that next processing is not described in the instruction form, the document distribution server 24C notifies the client terminal 14 that all processing has terminated, generates a log as a result of specific processing in the service linkage in the log generating unit 24f, associates the log with the service ID, transmits the log to the image processor 24A via the document management server 24B and the image processor 24A, which are service processing devices 24 of preceding stages, and terminates the linkage processing.

Figure 17:
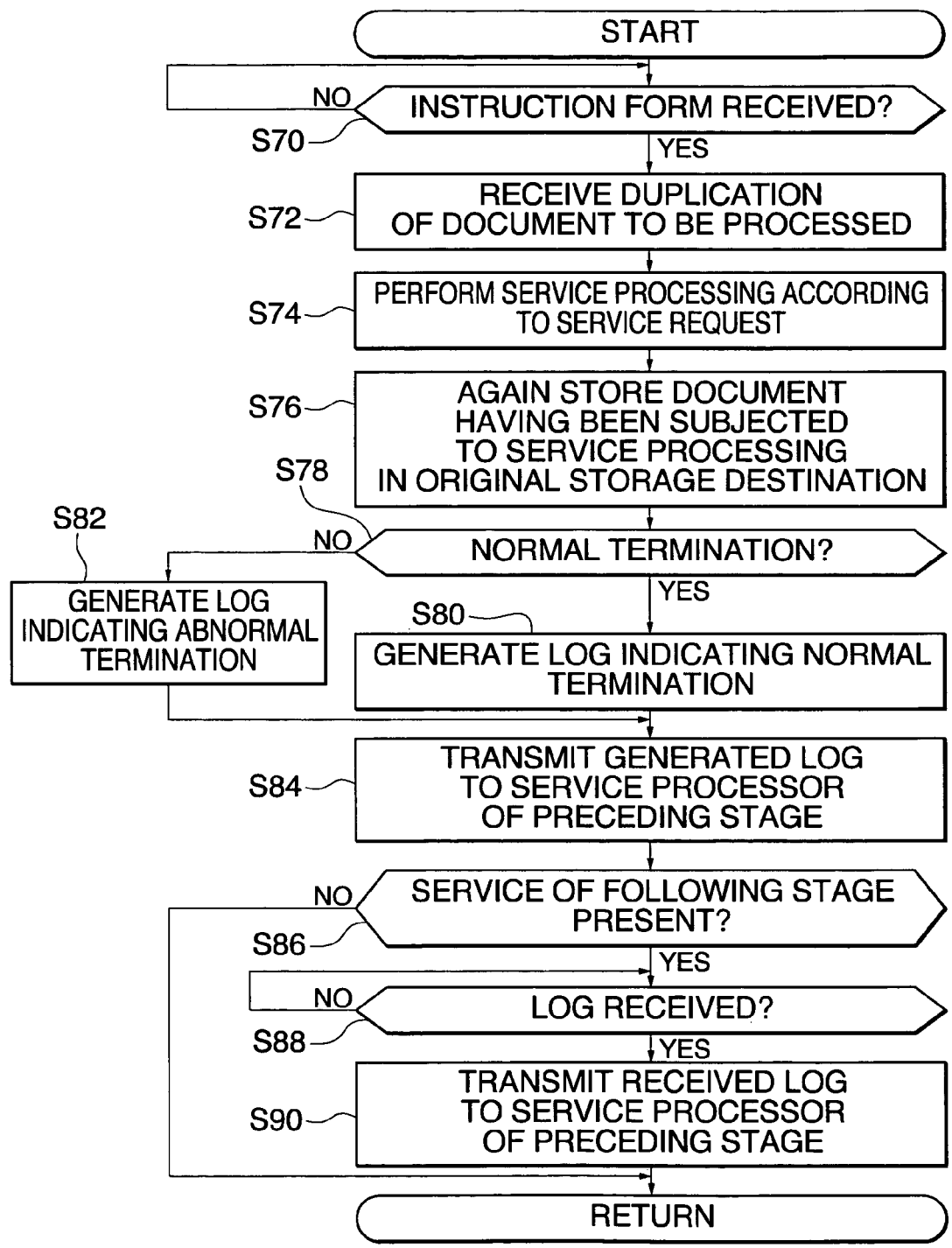
FIG. 17 is a flowchart showing the flow of processing performed in service processors, of the second embodiment.

A description is made of processing in the service processing devices 24 of the document processing system 11 according to the second embodiment, with reference to a flowchart of FIG. 17.

The service processing devices 24 determine whether they have received the instruction form, and waits until receiving it (S70). The service processing devices 24 duplicate and receive the document to be processed, on the basis of the storage destination location information of the document, described in the instruction form (S72) In this embodiment, the instruction form is transmitted from the instruction form management server 20 to the image processor 24A, the document management server 24B, and the document distribution server 24C in that order. However, the instruction form may be first transmitted from the multi-function device 24D to a service processor 24 performing specific processing in the beginning of service linkage, then successively to the service processing devices 24.

The service processing devices 24 interpret a service processing request described in the instruction form and performs service processing for the received document (S74), and again stores the document having been subjected to the service processing in the original storage destination (S76).

The service processor 24 determines whether specific processing based on the service processing request has terminated normally (S78), and if so, generates a log indicating normal termination in the log generating unit 24$f$ (S80); otherwise, it generates a log indicating abnormal termination in the log generating unit 24$f$ (S82). These logs are stored in the RAM 24$c$ of the service processing devices 24.

For example, the log generating unit 24$f$ of the service processing devices 24, as in the first embodiment, as shown in FIG. 11, logs a job ID for identifying processing in the specified device, a service ID for identifying service linkage, a data input source, service linkage contents, processing contents (job contents) of the specified device, start time, required time, status (normal termination, abnormal termination, etc.), error contents at abnormal termination, and the like.

The service processing devices 24 transmit a log generated by the log generating unit 24$f$ to a service processor 24 of a preceding stage (S84).

The service processing devices 24 determine from the instruction form whether service of a following stage is present (S86), and otherwise terminate processing of the service processing devices 24. If service of a following stage is present, the service processing devices 24 wait until they receive a log sent from a service processor 24 performing service of the following stage (S88), and transmits the received log to a service processor 24 having performed service of a preceding stage.

By the service processing devices 24 performing processing in this way, the multi-function device 24D can receive logs of the service processing devices 24 during service linkage by the log receiving unit 44 as shown in FIG. 11.

Figure 18:
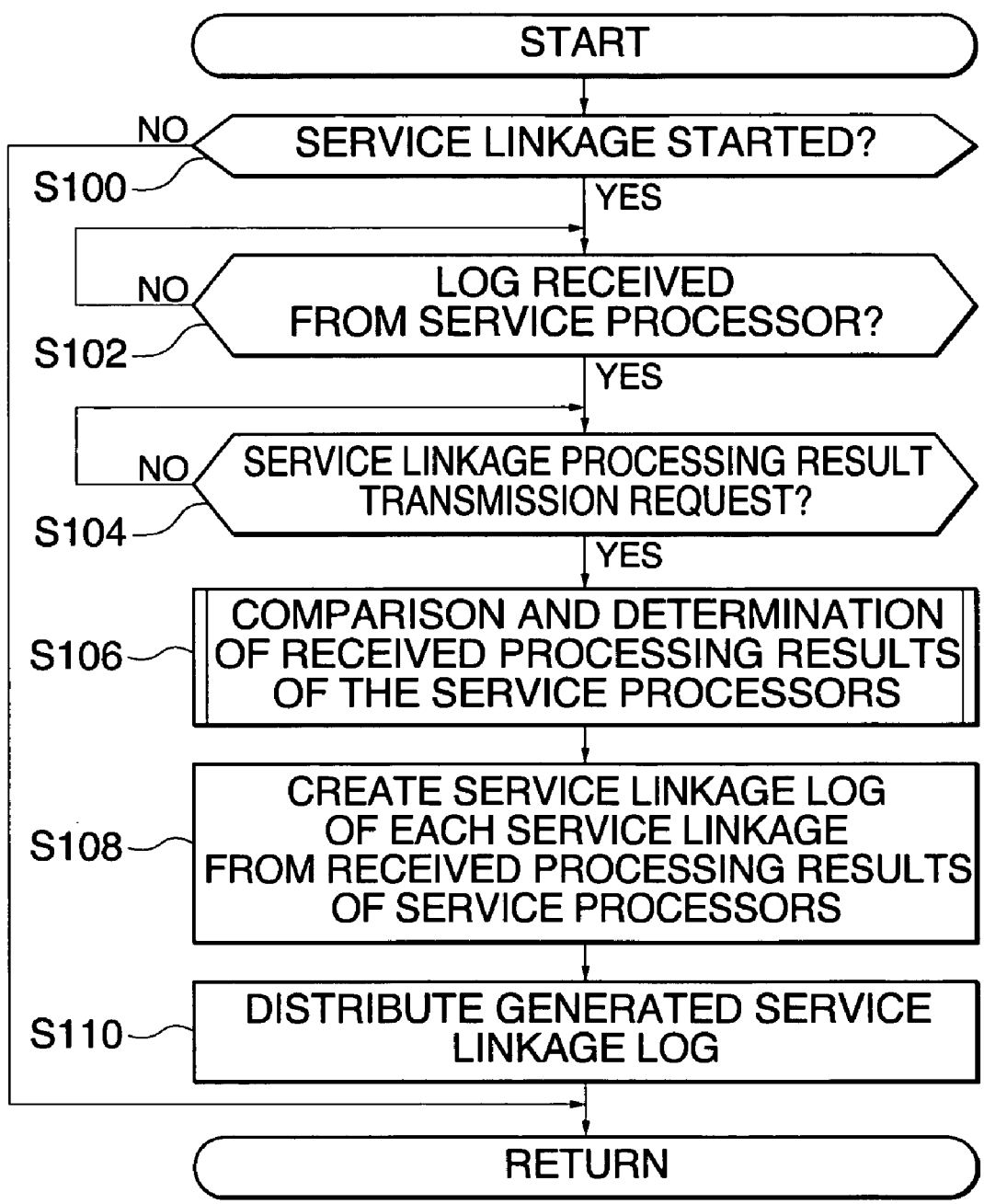
FIG. 18 is a flowchart showing the flow of processing result checking during service linkage performed in a multi-function, device of the second embodiment.

A description is made of the checking of processing results during service linkage in the multi-function device 24D, with reference to a flowchart of FIG. 18.

The multi-function device 24D, determines whether processing of service linkage is started (S100). For example, this is done by determining whether a document transmission request concerned in the service linkage has been made from the service processing devices 24. If the service linkage is not started, the processing is immediately returned and the multi-function device 24D returns to a state in which it can perform other processing. If the service linkage is started, it waits until it receives logs from the service processing devices 24 (S102).

Upon receipt of the logs from the service processing devices 24, the multi-function device 24D determines whether a request to transmit processing results of service linkage is made, and waits until the request is made (S104). The service linkage processing result transmission request can be made, for example, through a user interface such as an operation panel provided in the multi-function device 24D.

Upon receipt of the service linkage processing result transmission request, the multi-function device 24D, in the log comparison determination unit 46, performs log comparison determination processing to determine whether processing of each service linkage terminates normally, on the basis of the received logs of the service processing devices 24 (S106). It can be determined whether all service linkages have terminated normally by referring to results of processing of the service processing devices 24 for each of service IDs. In this case, service linkage log may be generated by extracting only service linkages not normally terminated, and it can be determined whether service linkages have terminated normally, by extracting only service linkage logs of service linkages not normally terminated.

As in the first embodiment, a service linkage log of each service linkage is generated from the received logs of the service processing devices 24 (S108), and the generated service linkage log is distributed (S110).

In other words, the user can determine whether the service linkage has terminated normally, by referring to the distributed service linkage log. For abnormal termination, a failed service processor 24 can be located, and the service linkage can be performed again from the failed service processor 24.

Next, a third embodiment of the present invention is described. Members in the third embodiment that are identical to members in the first and second embodiments are identified by the same reference numerals, and are excluded from detailed descriptions.

Although the document processing system 11 according to the second embodiment provides the processing result management function 40 for the multi-function device 24D, the processing result management function 40 may be provided in the service processing devices 24 performing services included in service linkage.

Figure 19:
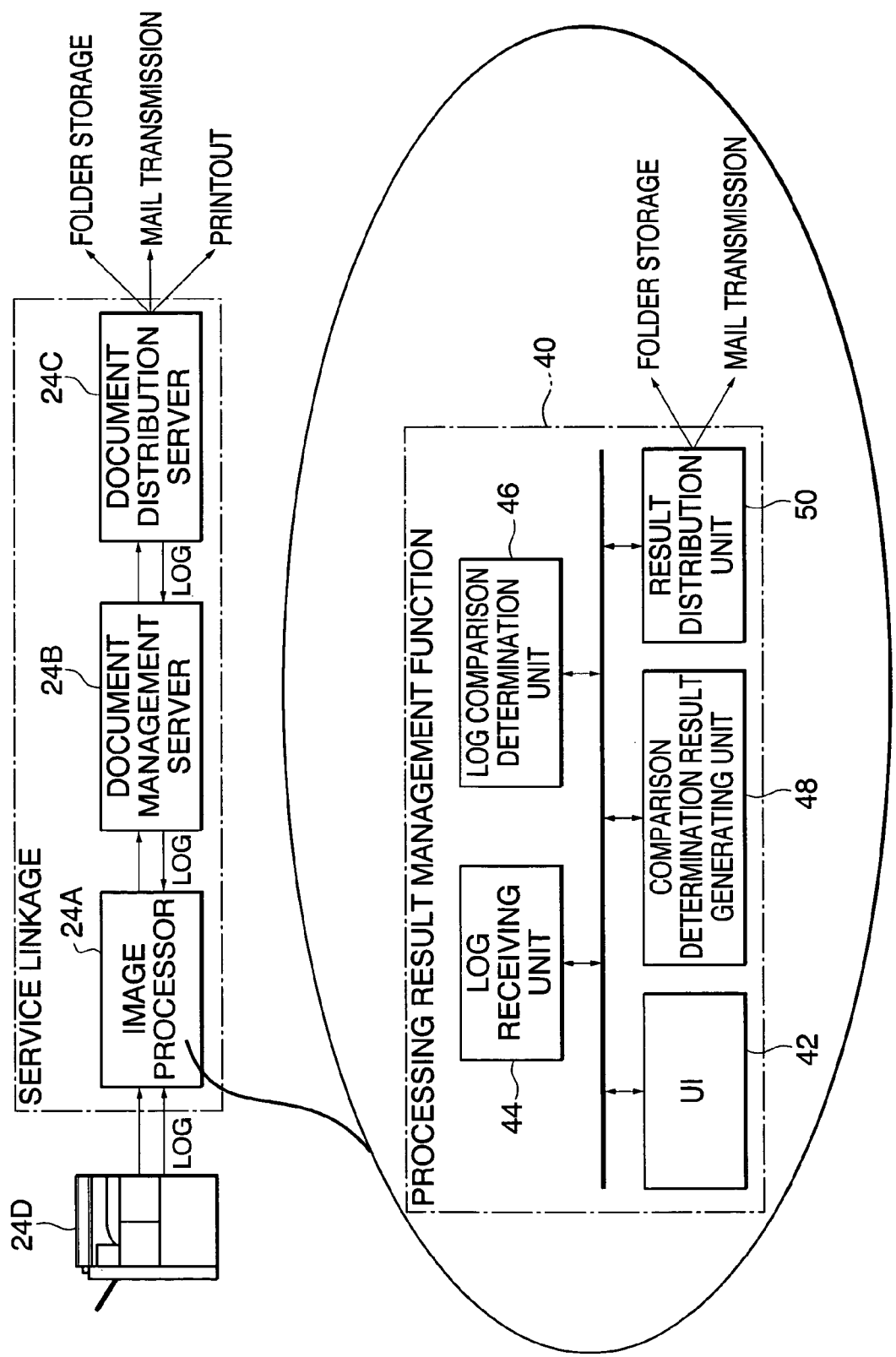
FIG. 19 is a block diagram showing the interrelationship among devices during processing result checking of service linkage in a document processing system according to a third embodiment of the present invention.

For example, as shown in FIG. 19, the processing result management function 40 can be provided in the image processor 24A. In the document processing system according to the third embodiment, the processing result management function 40 is provided in a service processor 24 performing service included in service linkage. The third embodiment is described using an example that the processing result management function 40 is provided in the image processor 24A as shown in FIG. 19.

Also in this embodiment, the parts of the processing result management function 40 may be configured in hardware or with software programs.

In this case, the, service processing devices 24 except the image processor 24A operate as in the second embodiment. Therefore, detailed descriptions of them are omitted.

Upon receipt of a log acquisition request form the image processor 24A, the multi-function device 24D transmits logs about images and documents subject to service linkage to the image processor 24A.

Figure 20:
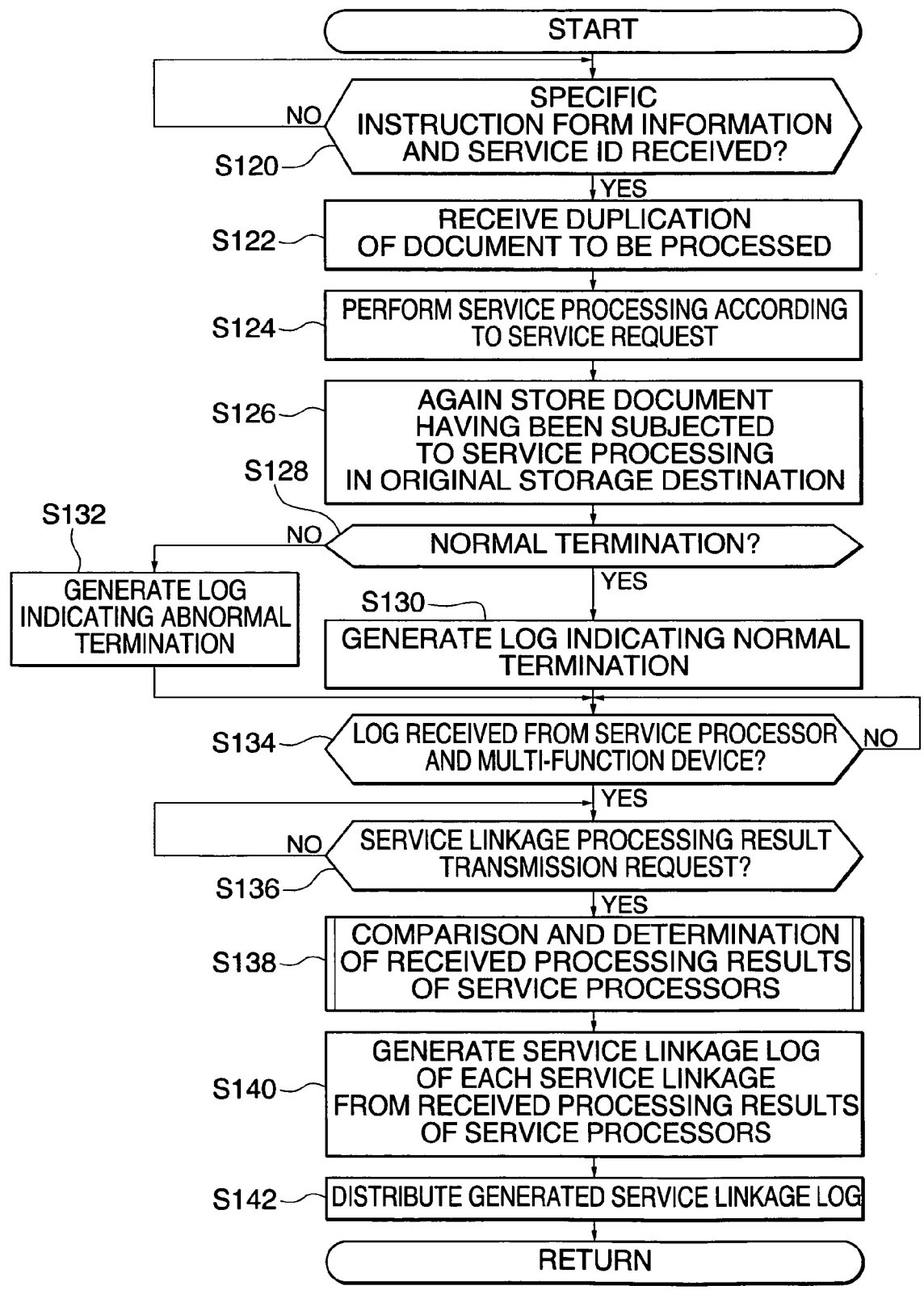
FIG. 20 is a flowchart showing the flow of processing performed in a service processor (image processor) of the second embodiment.

Processing performed in the image processor 24A is described with reference to a flowchart of FIG. 20.

The service processor 24A determines whether it has received the instruction form, and waits until it receives the instruction form (S120). The service processor 24A duplicates and receives the document to be processed, on the basis of the storage destination location information of the document, described in the instruction form (S122). The document to be processed may be successively transferred to the service processing devices 24 together with the instruction form.

The image processor 24A interprets a service processing request described in the instruction form and performs service processing for the received document (S124), and again stores the document having been subjected to the service processing in the original storage destination (S126).

The image processor 24A determines whether specific processing based on the service processing request has terminated normally (S128), and if so, generates a log indicating normal termination in the log generating unit 24$f$ (S130); otherwise, it generates a log indicating abnormal termination in the log generating unit 24$f$ (S132). These logs are stored in the RAM 24$c$ of the image processor 24A.

The image processor 24A determines whether logs have been received from the service processing devices 24 concerned in service linkage defined by the instruction form, and waits until it receives logs generated in the service processing devices 24 (S134). Logs of the service processing devices 24 concerned in service linkage defined by the instruction form are transmitted from a service processor 24 of the last stage successively to the service processing devices 24 of preceding stages as in the second embodiment, whereby the image processor 24A receives the logs of the service processing devices 24.

The image processor 24A determines whether a request to transmit processing results of service linkage is made, and waits until the request is made (S136). Upon receipt of the service linkage processing result transmission request, the image processor 24A, in the log comparison determination unit 46, performs log comparison determination processing to determine whether processing of each service linkage terminates normally, on the basis of the received logs of the service processing devices 24 (S138).

From the results of specific processing of the service processing devices 24 for each service ID, as in the first and second embodiments, a service linkage log of each service linkage is generated (S142), and the generated service linkage log is distributed (S142). Service linkage logs may be generated by extracting only abnormal processing results of service linkage, whereby it can be determined whether service linkage has terminated normally.

In other words, the user can determine whether the service linkage has terminated normally, by referring to the distributed service linkage log. For abnormal termination, a failed service processor 24 can be located and the service linkage can be performed again from the failed service processor 24.

In the document processing system of the third embodiment, the processing result management function 40 is provided in the image processor 24A, which is a service processor 24 performing processing in the beginning of service linkage defined by an instruction form. However, it may be provided in other service processing devices 24.

Although, in the above described embodiments, plural service processing devices, 24 are linked to provide service for performing predetermined processing, the service may be provided by one multi-function device collectively including the functions of the devices.

According to the present invention as described above, processing result logs of plural specific processes making up a service are received from plural devices, and service result information indicating whether the service has terminated normally is generated on the basis of the received processing result logs, whereby a service for performing predetermined processing on document data is processed through the linkage among plural devices connected to a network according to predetermined processing contents, without failing to recognize the occurrence of faults in the service devices.

The entire disclosure of Japanese Patent Application No. 2003-081200 filed on Mar. 24, 2003 including specification, claims, drawings and abstract is incorporated herein by reference in its entirety.

What is claimed is:

1. A service processing system processing a service for performing predetermined linkage processing on document data over a network, comprising:
a plurality of service processing devices including:
a processor that performs specific processing of the service;
a memory that stores processing result logs of the processor;
a processing result management device including:
a receiver that receives the processing result logs stored in the memory; and
a generator that generates service result information indicating whether linkage processing of the service has terminated normally, on the basis of the processing result logs of the plurality of service processing devices; and
a linking device that divides and sequentially links a service for linkage processing, the sequentially linked service to be processed by the plurality of service processing devices in an order determined by the sequential links.

2. The service processing system according to claim 1, wherein the processing result management device further includes an output part that outputs the service result information.

3. The service processing system according to claim 1, wherein the processing result management device is included in at least one of the plurality of service processing devices.

4. The service processing system according to claim 3, wherein the receiver receives the processing result logs through the service processing devices.

5. A processing result checking method of a service processing system that processes a service for performing predetermined linkage processing on document data among a plurality of service processing devices connected to a network, comprising:
receiving processing result logs in the service processing devices performing specific processing of the service;
generating service result information indicating whether the service has terminated normally, on the basis of the received processing result logs; and
providing and sequentially linking a service for linkage processing, the sequentially linked service to be processed by the plurality of service processing devices in an order determined by the sequential links.

6. The processing result checking method of the service processing system according to claim 5, further outputting the service result information.

7. The processing result checking method of the service processing system according to claim 5, wherein the service result information is generated by at least one of the plurality of service processors performing the specific processing.

8. The processing result checking method of the service processing system according to claim 7, wherein the processing result logs are received from the plurality of service processing devices performing the specific processing.

9. A processing result management device in a service processing system processing a service for performing predetermined linkage processing on document data over a network, the processing result management device comprising:
a receiver that receives processing result logs of the plurality of service processing devices performing specific processing of the service;
a generator that generates service result information indicating whether linkage processing of the service has terminated normally, on the basis of the processing result logs of the plurality of service processing devices; and
a linking device that divides and sequentially links a service for linkage processing, the sequentially linked service to be processed by the plurality of service processing devices in an order determined by the sequential links.

10. The processing result management device according to claim 9, further including an output part that outputs the service result information.

11. A service processing system processing a service for performing predetermined linkage processing on document data over a network, comprising:
- a plurality of service processing devices including:
- a processing means for performing specific processing of the service; and
- a storage means for storing processing result logs of the processor;
- a processing result management device including:
- a receiving means for receiving the processing result logs stored in the memory;
- a generating means for generating service result information indicating whether linkage processing of the service has terminated normally, on the basis of the processing result logs of the plurality of service processing devices; and
- a linking means for dividing and sequentially linking a service for linkage processing, the sequentially linked service to be processed by the plurality of service processing devices in an order determined by the sequential links.

12. The service processing system according to claim 11, wherein the processing result management device further includes an output means for outputting the service result information.

13. The service processing system according to claim 11, wherein the processing result management device is included in at least one of the plurality of service processing devices.

14. The service processing system according to claim 13, wherein the receiving means receives the processing result logs through the service processing devices.

15. A processing result management device in a service processing system processing a service for performing predetermined linkage processing on document data over a network, the processing result management device comprising:
- a receiving means for receiving processing result logs of a plurality of service processing devices performing specific processing of the service;
- a generating means for generating service result information indicating whether linkage processing of the service has terminated normally, on the basis of the processing result logs of the plurality of service processing devices; and
- a linking means for dividing and sequentially linking a service for linkage processing, the sequentially linked service to be processed by the plurality of service processing devices in an order determined by the sequential links.

16. The processing result management device according to claim 15, further including an output means for outputting the service result information.

* * * * *